United States Patent
Kremin et al.

(10) Patent No.: US 9,459,749 B1
(45) Date of Patent: *Oct. 4, 2016

(54) MULTI-STAGE STYLUS DETECTION

(71) Applicant: Wacom Co., Ltd., Saitama (JP)

(72) Inventors: Viktor Kremin, Lviv (UA); Ruslan Omelchuk, Lviv (UA); Mykhaylo Krekhovetskyy, Lviv (UA)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,802

(22) Filed: Apr. 14, 2015

Related U.S. Application Data

(63) Continuation of application No. 13/741,145, filed on Jan. 14, 2013, now Pat. No. 9,013,429.

(60) Provisional application No. 61/586,756, filed on Jan. 14, 2012, provisional application No. 61/730,756, filed on Nov. 28, 2012.

(51) Int. Cl.
*G06F 3/044* (2006.01)
*G06F 3/0354* (2013.01)

(52) U.S. Cl.
CPC ............ *G06F 3/044* (2013.01); *G06F 3/03545* (2013.01); *G06F 2203/04104* (2013.01); *G06F 2203/04106* (2013.01); *G06F 2203/04108* (2013.01)

(58) Field of Classification Search
CPC .. G06F 3/044; G06F 3/03545; G06F 3/0416; G06F 3/041; G06F 2203/04104; G06F 2203/04106; G06F 3/0412; G06F 2203/04808; G06F 3/03547; G06F 3/04883; G06F 2203/04111; H03K 17/962; H03K 17/955

USPC ............ 345/173, 174, 175, 177, 179; 178/18.01, 18.03, 18.06, 18.07, 19.01, 178/19.03, 19.04, 20.01

See application file for complete search history.

(56) References Cited

U.S. PATENT DOCUMENTS

| | | |
|---|---|---|
| 5,841,078 A | 11/1998 | Miller et al. |
| 5,920,309 A | 7/1999 | Bisset et al. |
| 6,396,484 B1 | 5/2002 | Adler et al. |
| 7,019,672 B2 | 3/2006 | Ely |
| 7,406,393 B2 | 7/2008 | Ely et al. |
| 8,120,591 B2 | 2/2012 | Krah et al. |
| 2003/0161278 A1 | 8/2003 | Igura |
| 2006/0012580 A1 | 1/2006 | Perski et al. |
| 2006/0219692 A1 | 10/2006 | Unsworth |
| 2007/0229468 A1 | 10/2007 | Peng et al. |
| 2010/0006350 A1 | 1/2010 | Elias |
| 2010/0098257 A1 | 4/2010 | Mueller |

(Continued)

FOREIGN PATENT DOCUMENTS

| | | |
|---|---|---|
| WO | 02/03368 A1 | 1/2002 |
| WO | 2012/177571 A1 | 12/2012 |
| WO | 2012/177571 A9 | 1/2014 |

*Primary Examiner* — Koosha Sharifi-Tafreshi
(74) *Attorney, Agent, or Firm* — Seed Intellectual Property Law Group PLLC

(57) ABSTRACT

A system comprises a processing device and a capacitive sense array that includes a plurality of electrodes. The system receives a first signal from a first scan of electrodes in a capacitive sense array. The system processes the first signal using a first set of sequences to detect a stylus. The system receives a second scan from a second scan of electrodes in a capacitive sense array. The system processes the second signal using a second set of sequences to detect the stylus.

22 Claims, 8 Drawing Sheets

(56) References Cited

U.S. PATENT DOCUMENTS

| | | |
|---|---|---|
| 2010/0155153 A1 | 6/2010 | Zachut |
| 2010/0292945 A1 | 11/2010 | Reynolds et al. |
| 2010/0328256 A1 | 12/2010 | Harada et al. |
| 2012/0105362 A1 | 5/2012 | Kremin et al. |
| 2012/0268415 A1 | 10/2012 | Konovalov et al. |
| 2012/0327041 A1 | 12/2012 | Harley et al. |
| 2012/0327042 A1 | 12/2012 | Harley et al. |
| 2013/0207906 A1 | 8/2013 | Yousefpor et al. |

$IRef_1 = \{+1\ -1\ -1\ +1\ +1\ -1\ -1\ +1\}$
$QRef_1 = \{+1\ +1\ -1\ -1\ +1\ +1\ -1\ -1\}$
} Set 610

$IRef_2 = (+1\ +1\ +1\ +1\ -1\ -1\ -1\ -1\}$
$QRef_2 = \{+1\ +1\ -1\ -1\ -1\ -1\ +1\ +1\}$
} Set 620

$IRef_3 = \{0.38, 0.92, 0.92, 0.32, -0.38, -0.92, -0.92, -0.32\}$
$QRef_3 = \{0.92, 0.32, -0.38, -0.92, -0.92, -0.32, 0.38, 0.92\}$
} Set 630

FIG. 6

MULTI-STAGE STYLUS DETECTION

RELATED APPLICATIONS

This application is a continuation of U.S. patent application Ser. No. 13/741,145, filed Jan. 14, 2013, which claims priority to U.S. Provisional Patent Application No. 61/586,756, filed Jan. 14, 2012 and U.S. Provisional Application No. 61/730,756, filed Nov. 28, 2012, all of which are incorporated by reference herein in their entirety.

TECHNICAL FIELD

This disclosure relates to the field of user interface devices and, in particular, to capacitive sensor devices.

BACKGROUND

The use of a stylus with a touch screen interface is well established. Touch screen designs have incorporated many different technologies including resistive, capacitive, inductive, and radio frequency sensing arrays. Resistive touch screens, for example, are passive devices well suited for use with a passive stylus. Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various tethered stylus approaches have been implemented for use with touch screens and are found in many consumer applications such as point-of-sale terminals (e.g., the signature pad used for credit card transactions in retail stores) and other public uses. Untethered active stylus approaches are also seen in various consumer applications. Generally, in an untethered active stylus approach, the stylus may be wirelessly synchronized to a capacitive sense array. A transmitter in or coupled to the capacitive sense array provides a synchronization signal that is received by a receiver in the stylus. The transmitter may wirelessly couple the synchronization signal in a variety of ways including, inductance, radio frequency, optical, ultrasound or other mediums. The stylus receives the synchronization signal from the transmitter and generates a transmit signal, based on the synchronization signal, which is detected by the capacitive sense array. Sensing circuitry in or coupled to the capacitive sense array can detect the presence of the stylus and determine a location of the stylus based on the detected transmit signal from the stylus.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

FIG. 6 illustrates example sets of sequences that may be used to detect a presence of a stylus, according to one embodiment.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Keeping synchronicity between the capacitive sense array and the stylus imposes a high burden on the system, as it has impacts on battery life, cost and design-in support. The system may be able reduce power usage and cost if an unsynchronized stylus (e.g., a stylus that does not synchronize with the operation of the capacitive sense array is used). In addition, reducing power usage for a system that uses a synchronized stylus and tracking a synchronized stylus more quickly may also be useful. Embodiments of a method and apparatus are described for detecting synchronized and unsynchronized styluses. In one embodiment, the system may perform a first scan of a subset of electrodes in the capacitive sense array to receive a first signal. The system may obtain a first in-phase component and a first quadrature component the first signal and calculate a first value based on the first in-phase component and a first quadrature component. The system may determine whether the square of sum the first value together with square of second value is greater than a threshold. If the combined value (e.g., the square of the sum of the first value combined with the square of the sum of the second value) is greater than a threshold, the system may perform a second scan of all of the electrodes in the capacitive sense array to receive a second signal. If the vector magnitude value of the second signal is greater than the threshold, the system may determine that the stylus is present or proximate to the capacitive sense array.

Figure 1:
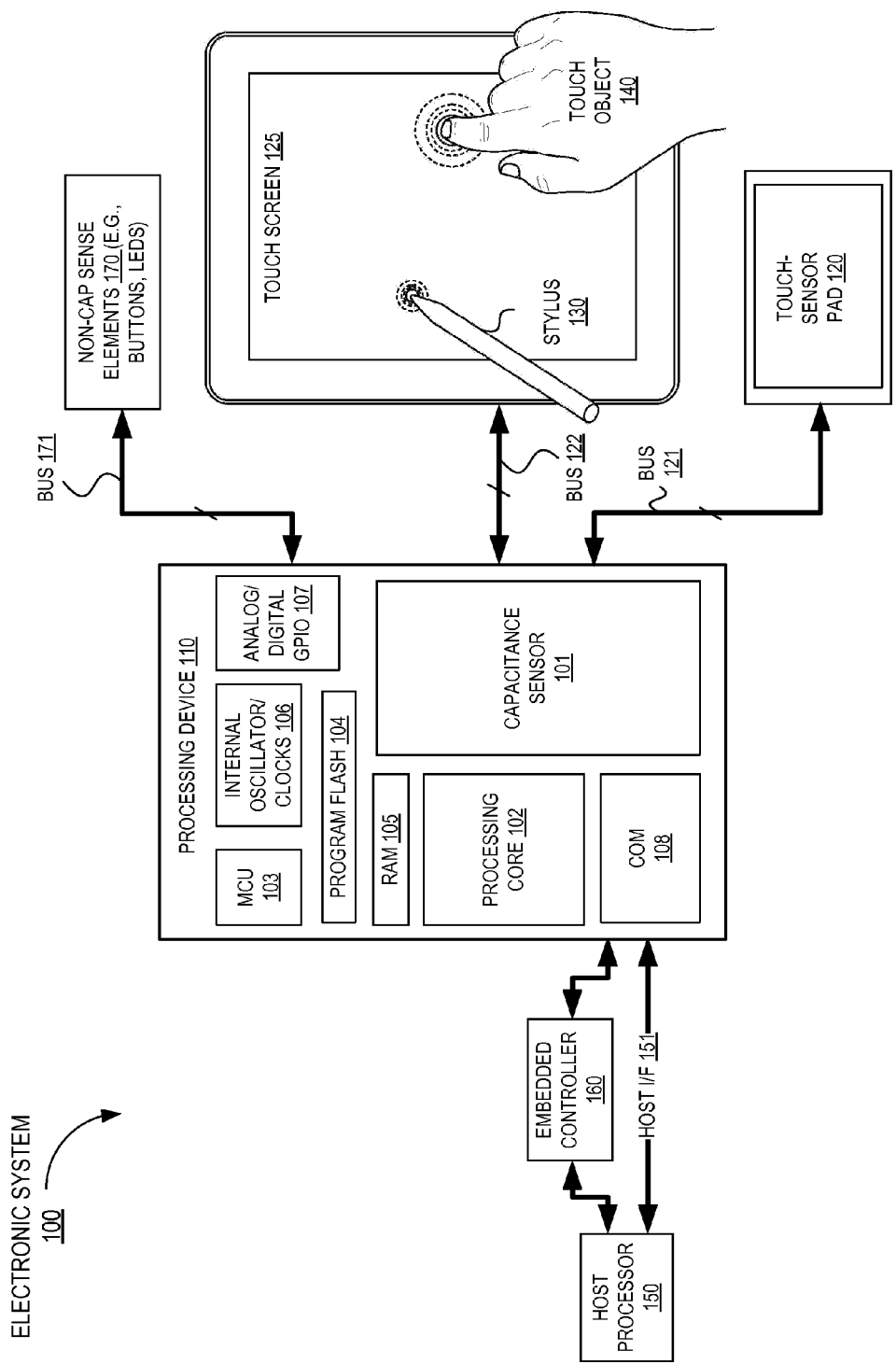
FIG. 1 is a block diagram illustrating one embodiment of an electronic system having a processing device for detecting a presence of a touch object and a stylus.

FIG. 1 is a block diagram illustrating one embodiment of an electronic system 100 having a processing device 110 for detecting a presence of a touch object 140 and a stylus 130. Electronic system 100 includes processing device 110, touch screen 125, touch sensor pad 120, stylus 130, host processor 150, embedded controller 160, and non-capacitance sense elements 170. In the depicted embodiment, the electronic system 100 includes the touch screen 125 coupled to the processing device 110 via bus 122. Touch screen 125 may include a multi-dimension capacitive sense array. The multi-dimension sense array may include multiple sense elements, organized as rows and columns. In another embodiment, the touch screen 125 operates as an all-points-addressable ("APA") mutual capacitance sense array. In another embodiment, the touch screen 125 operates as a coupled-charge receiver.

The operations and configurations of the processing device 110 and the touch screen 125 for detecting and tracking the touch object 140 and stylus 130 are described in detail below with respect to FIGS. 2A-8. In short, the processing device 110 is configured to detect a presence of the stylus 130 on the touch screen 125, as well as a presence of the touch object 140. The processing device 110 may detect and track the stylus 130 and the touch object 140 individually on the touch screen 125. In one embodiment, the processing device 110 can detect and track both the stylus 130 and touch object 140 concurrently on the touch screen 125. As described herein, the touch screen 125 capacitively couples with the stylus 130, as opposed to conventional inductive stylus applications. It should also be noted that the same assembly used for the touch screen 125, which is configured to detect touch objects 140, is also used to detect and track the stylus 130 without an additional PCB layer for inductively tracking the stylus 130 as done conventionally.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102.

The processing device 110 may also include an analog block array (not shown). The analog block array is also coupled to the system bus. Analog block array also may be configured to implement a variety of analog circuits (e.g., ADCs or analog filters) using, in one embodiment, configurable UMs. The analog block array may also be coupled to the GPIO ports 107.

As illustrated, capacitance sensor 101 may be integrated into processing device 110. Capacitance sensor 101 may include analog I/O for coupling to an external component, such as touch sensor pad 120, touch screen 125, touch-sensor slider (not shown), touch-sensor buttons (not shown), and/or other devices. Capacitance sensor 101 and processing device 110 are described in more detail below.

In one embodiment, the electronic system 100 includes a touch sensor pad 120 coupled to the processing device 110 via bus 121. Touch sensor pad 120 may include a multi-dimension capacitive sense array. The multi-dimension sense array may include multiple sense elements, organized as rows and columns. In another embodiment, the touch sensor pad 120 is an APA mutual capacitance sense array. In another embodiment, the touch sensor pad 120 operates as a coupled-charge receiver.

In an embodiment, the electronic system 100 may also include non-capacitance sense elements 170 coupled to the processing device 110 via bus 171 and GPIO port 107. The non-capacitance sense elements 170 may include buttons, light emitting diodes ("LEDs"), and other user interface devices, such as a mouse, a keyboard, or other functional keys that do not require capacitance sensing. In one embodiment, buses 121, 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configured to communicate with the embedded controller 160 or the host processor 150 to send and/or receive data.

Processing device 110 may reside on a common carrier substrate such as, for example, an integrated circuit (IC) die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance sensor 101 may be integrated into the IC of the processing device 110, or alternatively, in a separate IC. Alternatively, descriptions of capacitance sensor 101 may be generated and compiled for incorporation into other integrated circuits. For example, behavioral level code describing capacitance sensor 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 101.

It should be noted that the components of electronic system 100 may include all the components described above. Alternatively, electronic system 100 may include only some of the components described above.

In one embodiment, the electronic system 100 is used in a tablet computer. Alternatively, the electronic device may be used in other applications, such as a notebook computer, a mobile handset (e.g., a smartphone or a cellular phone), a personal data assistant ("PDA"), a keyboard, a television, a remote control, a monitor, a handheld multi-media device, a handheld media (audio and/or video) player, a handheld gaming device, a signature input device for point of sale transactions, and eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition, and numeric keypad operation.

Figure 2A:
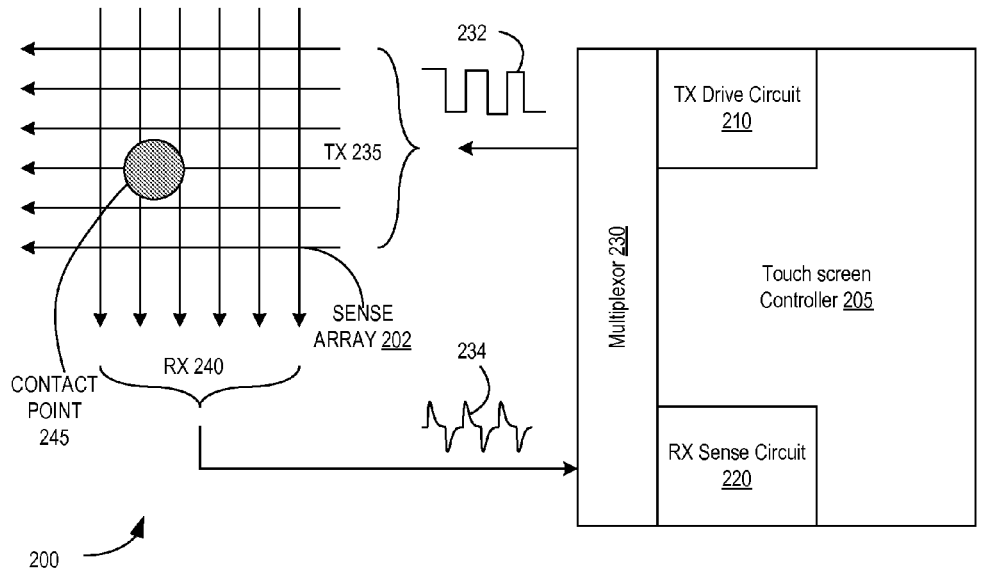
FIG. 2A is a block diagram illustrating a system including a capacitive sense array and a touch screen controller that converts measured capacitances to touch coordinates, according to an embodiment.

FIG. 2A is a block diagram illustrating one embodiment of a system 200 including the sense array 202 and a touch screen controller 205 that converts measured capacitances to touch coordinates. In an embodiment, the touch screen controller 205 is similar to the capacitance sensor 101 described above. In another embodiment, the touch screen controller 205 is the processing device 110. The sense array 202 includes TX lines 235 and RX lines 240. In an embodiment, the touch screen controller 205 includes a TX drive circuit 210, an RX sense circuit 220, and a multiplexor 230.

In an embodiment, a passive object (e.g., a finger or other conductive object) touches, or comes in close proximity to, the sense array 202 at contact point 245. The TX drive circuit 210 drives the TX lines 235 with TX signal 232. In one embodiment, TX driver circuit 210 may include a signal generator. The RX sense circuit 220 measures the RX signal 234 on RX lines 240. In an embodiment, the touch screen controller 205 determines the location of contact point 245. The TX lines 235 and RX lines 240 are multiplexed by multiplexor 230. The touch screen controller 205 provides the TX signal 232 on the TX lines 235 (rows) and measures the capacitance coupling on the RX lines 240 (columns). In an embodiment, the TX and RX lines 235, 240 are orthogonal and may be used interchangeably (e.g., transmitting on columns and receiving on rows). In an embodiment, the TX drive circuit 210 transmits the TX signal 232 through a high impedance ITO panel (TX lines 235), thus limiting the upper frequency limit and speed of the system. The total scan time may also depend upon the number of TX lines 235 and RX lines 240 in the sense array 202. For example, the TX drive circuit 210 provides a TX signal 232 on each TX line 235 and simultaneously reads the capacitively coupled RX signal 234 on each RX line 240, according to one embodiment. In another embodiment, the RX lines 240 are multiplexed in two or more scans, as described in conjunction with FIG. 2B. This may be one (of multiple) modes of operation of touch screen controller 205 (e.g., a touch mode or a finger mode).

Although the electrodes (e.g., lines 235 and 240) appear as lines in FIG. 2A, these electrodes may represent bars or elongated rectangles or other tessellated shapes such as diamonds, rhomboids, and chevrons. Alternatively, other useable shapes may be used as would be appreciated by one of ordinary skill in the art having the benefit of this disclosure.

Figure 2B:
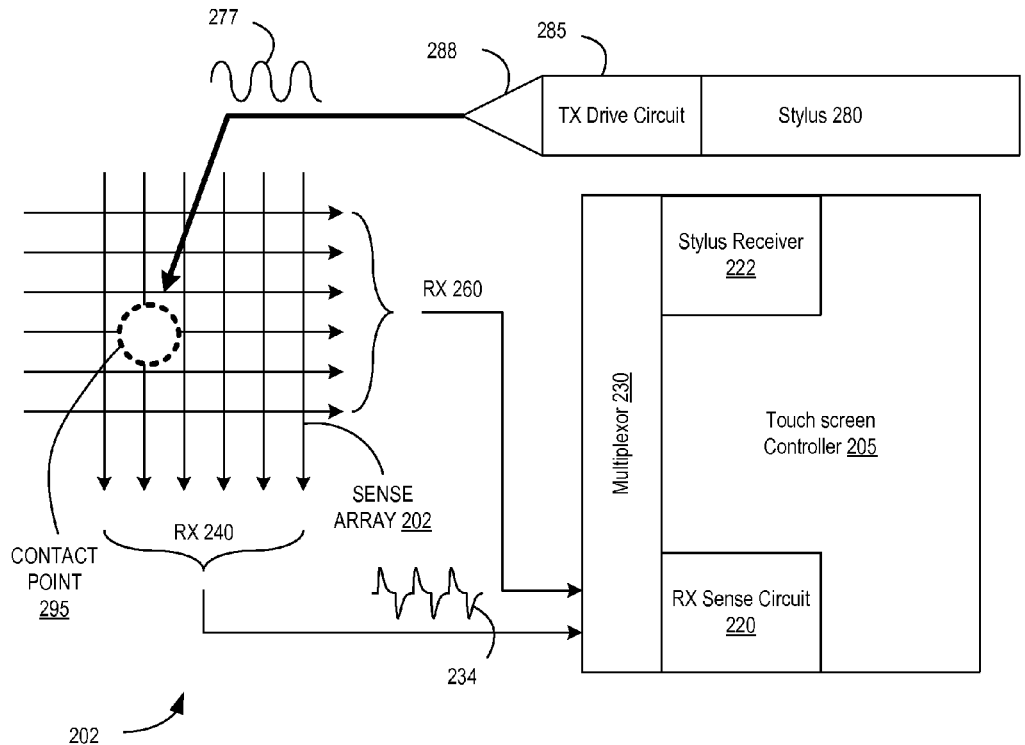
FIG. 2B is a block diagram illustrating a system including a capacitive sense array, a stylus, and a touch screen controller that converts measured capacitances to touch coordinates, according to an embodiment.

FIG. 2B is a block diagram illustrating one embodiment of a system 202 including the sense array 202, a stylus 280, and a touch screen controller 205 that converts measured capacitances to touch coordinates in another mode of operation (e.g., a stylus mode). In an embodiment, the touch screen controller 205 is similar to the capacitance sensor 101 described above. In another embodiment, the touch screen controller 205 is the processing device 110. The sense array 202 may be part of touch screen 125 or touch sensor pad 120 described above. In one embodiment, the sense array 202 may include RX lines 240 and 260. The touch screen controller 205 may include an RX sense circuit 220 and a multiplexor 230. The stylus 280 may include a TX drive circuit 285 and a stylus tip 288.

In one embodiment, the TX drive circuit 285 of stylus 280 provides a TX signal 277 directly to contact point 295 on sense array 202. The stylus tip 288 may actually touch a surface of the sense array 202 at contact point 295 or may come within a relatively close proximity of sense array 202. In one embodiment, the stylus 280 may not directly contact the electrodes in the sense array 202. The stylus 280 may contact a substrate above the sense array 202 or may contact a substrate on which the sensor array 20 is deposited. The substrate may be a dielectric material. The RX sense circuit 220 in touch screen controller 205 may measure the RX signal 234 on both the rows (RX lines 260) and columns (RX lines 240) of sense array 202 and stylus receiver 222 may identify the presence as stylus 280. In one embodiment, the touch screen controller 205 performs a stylus scan of the sense array 202 during RX sensing of the stylus TX signal 277. For the stylus scan, the touch screen controller 205 may measure a charge being capacitively coupled to the row and column electrodes of the sense array 202 from the stylus 280. In an array of N rows and M columns, a complete scan could only include a single RX signal measurement on each row and column, or N+M scans, thus resulting in a significantly reduced stylus scanning time for the entire sense array as compared with a mutual capacitance scanning time for the entire sense array. In one embodiment, multiple RX channels can be used to sense multiple RX lines at the same time. In this case, the complete scan could be (N+M)/(# RX channels).

As described above, a passive stylus may be used as a touch object to interface with the various touch screens described above. In contrast to passive styluses, an active stylus, as described herein provides the transmit ("TX") signal 277 that is typically provided by the touch screen controller 205 in finger sensing modes (e.g., touch modes). In one embodiment, the stylus 280 capacitively couples the stylus TX signal 277 to the sense array 202. In one embodiment, the stylus signal amplitude, frequency, phase, etc., may be the same or similar to that which is utilized for finger sensing by the touch screen controller 205. Alternatively, the stylus TX signal 277 may be different than the TX signal used for finger sensing in amplitude, frequency, and/or phase, and may thus be unsynchronized with TX signal 232. In another embodiment, the stylus TX signal 277 may have a different code for code modulation than a code used in the TX signal for finger sensing. In an exemplary embodiment, the stylus TX signal 277 has a greater amplitude than the finger sensing TX signal.

In one embodiment, the frequency of the stylus TX signal 277 is different than the frequency of the finger sensing TX signal. By using different TX frequencies, the touch screen controller 205 can differentiate between stylus TX signals and finger sensing TX signals. Alternatively, the touch screen controller 205 can differentiate the stylus TX signals from the TX drive circuit 210 TX signals 232 using other techniques as would be appreciated by those of ordinary skill in the art with the benefit of this disclosure, such as detecting the difference in signal characteristics (e.g., phase, frequency, amplitude, and code modulation). Various embodiments described herein are applicable to any mutual capacitance touch screen system using an untethered, or wireless active stylus (e.g., either synchronized or unsynchronized) configured to be capacitively coupled to the mutual capacitance array.

In one embodiment, the unsynchronized capacitive stylus receiver 222 has a low-impedance current input (i.e., RX signal 234). The low-impedance current input allows for stylus receiver input signal dependence elimination from parasitic capacitance change in the sensor electrodes of sense array 202. The sensor parasitic capacitance may change when human finger or palm is present on or near the sense array 202, however, stylus position should not be changed in this case. When the stylus receiver 222 has a low-impedance input, the changing panel parasitic capacitance may have no effect on the receiver signal. Capacitive stylus receiver 222 may further provide the narrow band sensing for out-of-band noise reduction. In one embodiment, stylus receiver 222 should provide sensing for only the stylus transmitter frequency. In addition, the receiver bandwidth should be easily controllable to eliminate the need to use more expensive ceramic or crystal oscillators. Furthermore, the stylus receiver 222 may provide ability to perform conversion within short time intervals. For example, the stylus position sensing time may take only approximately 20-30 periods of the stylus transmitter carrier signal. This allows sensing of the entire sense array 202 in a short period of time (e.g., 2 milliseconds). The touch screen controller readings may also be independent of the initial phase of the stylus transmitter carrier signal 277. This allows the receiver to provide the same readings at different initial phase conditions of the transmitter carrier signal 277.

Although the electrodes (e.g., lines 235 and 240) appear as lines in FIG. 2A, these electrodes may represent bars or elongated rectangles or other tessellated shapes such as diamonds, rhomboids, and chevrons. Alternatively, other useable shapes may be used as would be appreciated by one of ordinary skill in the art having the benefit of this disclosure.

Figure 3:
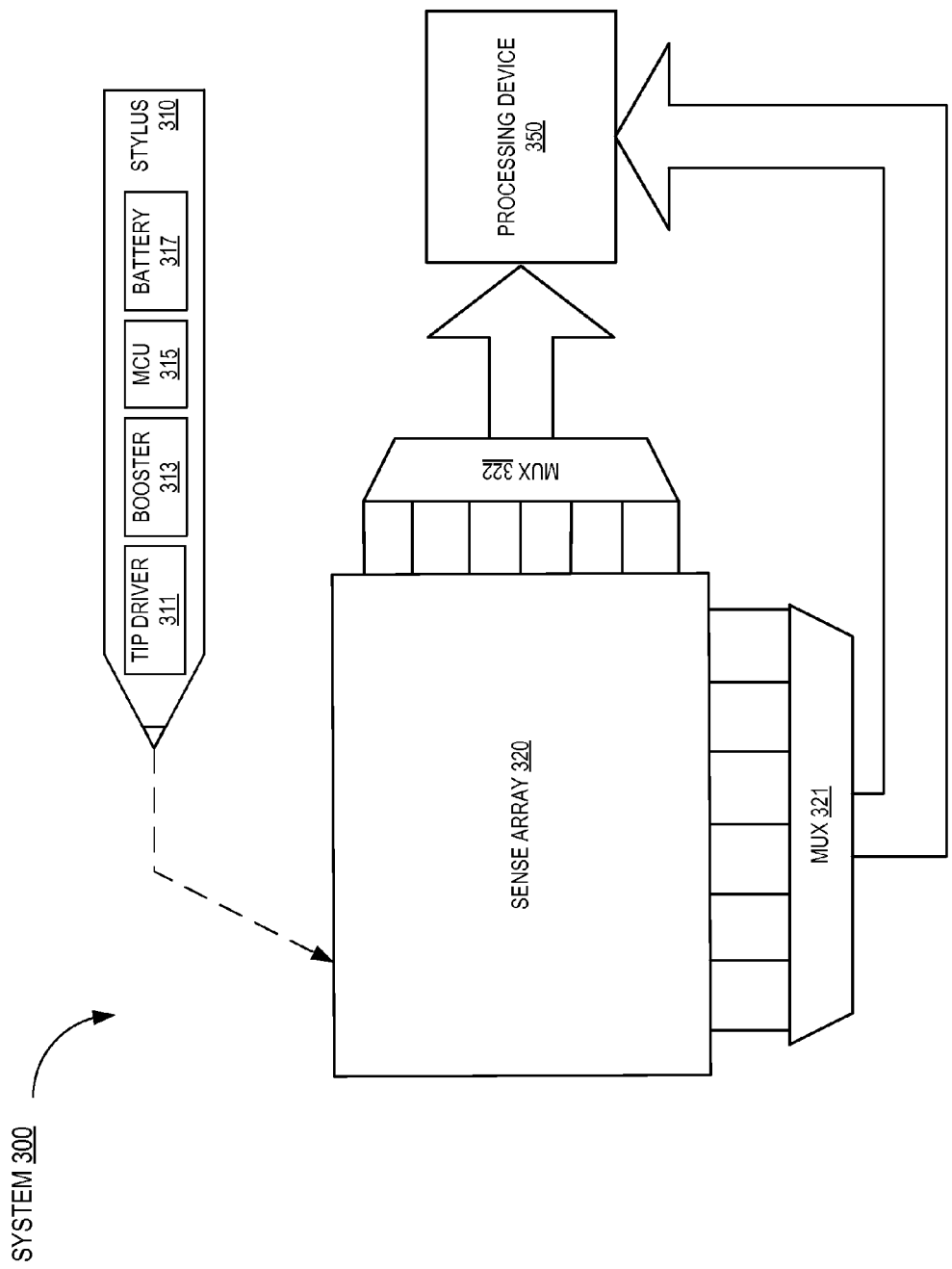
FIG. 3 is a block diagram illustrating a system according to one embodiment.

FIG. 3 is a block diagram illustrating a system 300 according to one embodiment. The system 300 includes a stylus 310, a sense array 320, a multiplexer (MUX) 321, a MUX 322, and a processing device 350 that converts measured signals to touch coordinates. The stylus 310 includes a tip driver 311, a booster 313, a microcontroller (MCU) 315, and a battery 317. In one embodiment, the stylus 310 may be an active stylus (e.g., a stylus that includes an internal power source or power supply, such as a battery). In another embodiment, the stylus 310 may be an unsynchronized stylus (e.g., the operation or timing of the stylus 310 may not be synchronized with the operation or timing of the sense array 320 or processing device 350). The MCU 315 may generate a stylus TX signal (such as TX signal 277 illustrated in FIG. 2B). In one embodiment, the MCU may be implemented using a combination of processing logic, state machines, and other circuitry. The MCU 315 may provide the TX signal to the tip driver 311 which provides the TX signal to the stylus tip where the TX signal is capacitively coupled to the sense array 320. The processing device 350 may sense this signal and may resolve this to be the point of the stylus 310. The booster 313 may increase or boost the strength of the TX signal generated by the tip driver 311. The battery 317 may provide power to the MCU 315 to generate the TX signal and may also be used to provide power to a booster 313, which may be used to increase the strength of the TX signal transmitted by the tip driver 311.

In one embodiment, the processing device 350 may be similar to a touch screen controller (such as touch screen controller illustrated in FIGS. 2A and 2B). In another embodiment, the processing device 350 may be similar to a capacitance sensor (such as capacitance sensor 101 illustrated in FIG. 1). The sense array 320 may include multiple electrodes that may be configured as TX electrodes or RX electrodes. The sense array 320 may include vertical electrodes (as illustrated in FIGS. 2A and 2B) and horizontal electrodes (as illustrated in FIGS. 2A and 2B). The processing device 350 may measure the TX signal transmitted by the stylus 310 using the electrodes in the sense array. The MUX 321 can be used to connect one or more of the vertical electrodes (e.g., 4, 8, 16, etc., vertical electrodes) to the processing device 350. The MUX 322 can be used to connect one or more of the horizontal electrodes e.g., 4, 8, 16, etc., horizontal electrodes) to the processing device 350. The processing device 350 may scan the electrodes that are connected by the MUXes 321 or 322, to detect the TX signal transmitted by the stylus 310. The MUXes 321 and 322 may connect any number of electrodes to the processing device 350.

In one embodiment, the processing device 350 may perform scans to detect the TX signal from the stylus 310 in two stages. During the first stage, the processing device 350 may scan all of the electrodes (e.g., perform a full scan of all horizontal and all vertical electrodes) in the sense array 320 to determine the location of the stylus 310 on the sense array 320. After determining the location (e.g., position) of the stylus 310, the processing device may proceed to a second stage, where the processing device identifies a subset of the electrodes in the sense array 320 and scans the subset of the electrodes to detect the TX signal transmitted by the stylus 310. In another embodiment, the processing device 350 may continually perform scans of subsets of the electrodes to detect the TX signal transmitted by the stylus 310. By scanning subsets of the electrodes, the processing device 350 may be able to track the movement or position of the stylus 310 more quickly or efficiently than performing full scan (e.g., a scan of all the electrodes in the sense array 320. In a further embodiment, the processing device 350 may estimate or predict the motion of the stylus 310 based on previous locations or positions of the stylus determined during previous scans. The processing device 350 may identify subsets of electrodes for the next scan, based on the estimated motion of the stylus 310. In one embodiment, the sense array 320 and the processing device 350 may switch from a first mode of operation which determines whether the stylus 310 is present (e.g., whether the TX signal from the stylus 310 is detected) to a second mode (e.g., a touch mode) of operation which may detected touch objects (e.g., conducted objects such as a finger). The sense array 320 and the processing device 350 may switch to the second mode of operation when the TX signal from the stylus 310 is no longer detected.

Figure 4:
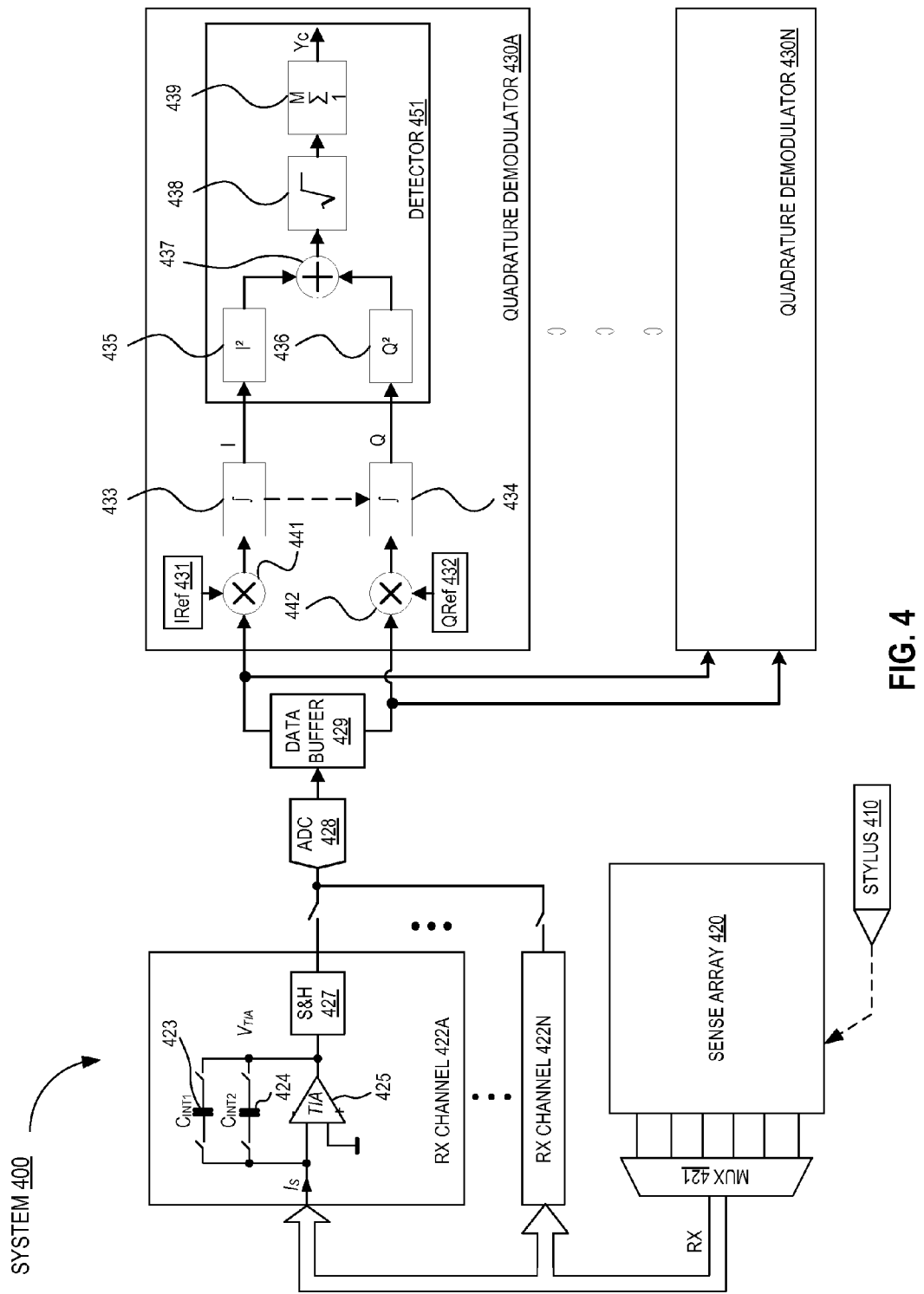
FIG. 4 is a block diagram illustrating a system according to another embodiment.

FIG. 4 is a block diagram illustrating a system 400 according to another embodiment. The system 400 includes a stylus 410, a sense array 420, a MUX 4211, RX channels 422A through 422N (which may be part of multiple receivers), an ADC 428, a data buffer 429, and quadrature demodulators 430A through 430N. In one embodiment, the stylus 410 may be a synchronized stylus. In another embodiment, the stylus 410 may be an unsynchronized stylus (e.g., the operation or timing of the stylus 410 may not be synchronized with the operation or timing of the sense array 420. The stylus 410 may capacitively couple or transmit a TX signal to one or more electrodes in the sense array 420. The MUX 421 may connect one or more electrodes (e.g., 4 electrodes, 8 electrodes, etc.) to the RX channels 422A through 422N.

In one embodiment, each of the RX channels 422A through 422N may scan or sense an electrode in the sense array 420. The RX channel 422A receives an input signal $I_s$ from the electrode. The signal is provided to integrating capacitors 423 and 424 (e.g., integrating capacitors $C_{INT1}$ and $C_{INT2}$). The input signal $I_s$ is also provided to a trans-impedance amplifier (TIA) circuit 425. The output of the integrating capacitors 423 and 424 (e.g., integrating capacitors $C_{INT1}$ and $C_{INT2}$) is combined with the output of the TIA circuit 425 in two different stages. The first integrating capacitor 423 is coupled to the TIA circuit 425 at the first stage. The combined output of the integrating capacitor 423 and the TIA circuit 425 (from the first stage) is provided to sample and hold (S&H) circuit 427 which samples the output (e.g., the first output voltage or signal). The second integrating capacitor 424 is coupled to the TIA circuit 425 at the second stage. The combined output of the integrating capacitor 424 and the TIA circuit 425 (from the second stage) is provided to S&H circuit 427 which samples the output (e.g., the output voltage or signal). The S&H circuit 427 may determine the difference between the first output and the second output and may provide the difference (e.g., the voltage difference) to the output of the RX channel 422A. The output of the RX channel 422A (e.g., the voltage difference) is provided to an analog-to-digital converter (ADC) 428. In one embodiment, the RX channel 422A may perform a current to voltage conversion of the input signal $I_s$. The RX channel 422A (e.g., the integrating capacitors 423 and 424, the TIA circuit 425) may also be referred to as a synchronous demodulator.

RX channels 422B through 422N may include components similar to RX channel 422A (e.g., integrating capacitors, an S&H circuit, etc.) and may perform operations, functions, or actions similar to RX channel 422A. Each of the RX channels 422B through 422N may also process an input signal (e.g., $I_s$) and may provide the output (e.g., a processed signal) to the ADC 428, similar to RX channel 422A. It should be understood that the system 400 may include any number of RX channels. For example, the system 400 may include four RX channels, sixteen RX channels, one hundred RX channels, etc.

The ADC 428 may convert an analog signal (e.g., a wave or curved signal) received from the RX channel 422A (which may be part of a receiver) into a digital signal (e.g., a sequence of digital values). The ADC 428 provides the converted digital signal to a data buffer 429 which may store the converted digital signal (e.g., may store the "0" and "1" values of the digital signal). In one embodiment the ADC 428 may sample the output of the RX channel 422A one or more frequencies (e.g., 600 Hz or 600 times a second, 300 kHz or 300,000 times a second, etc.). In one embodiment, ADC 428 may sample the analog signal received from the RX channel 422A at a certain frequency ($F_{ADC}$). For example, the ADC 428 may sample the analog signal at 900 Hz, or at 100 kHz. The frequency at which the ADC 428 samples the analog signal may be based on one or more of the frequency of the TX signal ($F_{ST}$) transmitted by the stylus 410 and the reference sequences (e.g., IRef 431 and QRef 432). In one embodiment, the frequency of the sampling frequency of the ADC 428 may be selected such that the TX signal frequency from the stylus is located on the near the frequency response peak of the receive channel 422A (e.g., the narrow band receiver). This may maximizing the sensitivity of the receive channel 422A (e.g., the ability of the receiver to detect the stylus TX signal). For example, the sampling frequency of the ADC 428 may be set such that $F_{ST}=1.75*F_{1ADC}$, where $F_{ST}$ is the frequency of the stylus TX signal. In another example, the frequency of the ADC 428 may be set such that $F_{ST}=1.86*F_{2ADC}$, where $F_{1ADC}$, $F_{2ADC}$ are the first ADC sampling frequency and the second ADC sampling frequencies respectively. The sample frequency of the ADC 428 may be based on one or more of the IRef sequence and the QRef sequence used by the quadrature demodulators 430A through 430N, the frequency of the TX signal from the stylus, etc. In one embodiment, the ADC sampling frequency may be selected based on a tradeoff between the ADC 428 power usage and implementation area on the die of a processor (e.g., on a PSoC®), the stylus TX signal frequency, and additional receiver frequency response peaks due to aliasing effects (e.g., aliasing frequency). The frequency response peaks may be outside the frequencies of possible interference noise sources, such as a power charger, noise coming from LCD, etc.

In one embodiment, the sampling frequency of the ADC 428 may be changed from time to time. For example, during a first scan of the electrodes in the sense array 420 the sampling frequency of the ADC 428 may be set to $F1_{ADC}$ and during a second scan of the electrodes in the sense array 420 the sampling frequency of the ADC 428 may be set to $F2_{ADC}$. In one embodiment, changing of the ADC sampling frequency (e.g., using a first sampling frequency for a first scan and using a second sampling frequency for a second scan) and changing the quadrature sequences (e.g., using different IRef and QRef sequences when processing the first signal from the first scan and the second signal from the second scan) may improve the noise immunity of the system when detecting the stylus 410 because the frequency of the peak (e.g., central) frequency of the receiver remains the same, frequencies of the aliases (e.g., alias frequencies) in the receiver are changed. Therefore, if an interference signal (e.g., a signal from an interference source, such as a power charger or an LCD screen) passes to one of the aliasing frequencies, then the interference signal may be removed or reduced by changing one or more of the ADC sampling frequency and the quadrature sequences.

The digital signal stored in the data buffer 429 may be provided to quadrature demodulators 430A through 430N. Quadrature demodulator includes multipliers 441 and 442, integrators 433 and 434, and a detector 452. Multiplier 441 multiples the digital signal by an in-phase sequence IRef 431 and multiplier 442 multiples the digital signal by a quadrature sequence QRef 432. The in-phase sequence IRef 431 and the quadrature sequence QRef 432 may be used to obtain or separate an in-phase component and a quadrature phase component from the digital signal received from the data buffer 429. The in-phase sequence IRef 431 and the quadrature sequence QRef 432 may be sequences of numeral values (e.g., the sequence [−1, 1, 1, −1] or the sequence [0.38, 0.92, −0.92, 0.92, −0.38, −0.38, 0.92, 0.38], etc.). The numerical values may be one or more of positive values, negative values, integer values, decimal values, floating point values, fractions, etc.

In one embodiment, the in-phase sequence IRef 431 and the quadrature sequence QRef 432 may have any number of values (e.g., the sequences may have different lengths). For example, the in-phase sequence IRef 431 may have sixteen values or may have ten values. In another embodiment, the in-phase sequence IRef 431 and the quadrature sequence QRef 432 used by the quadrature demodulator 430A may be changed. For example, during different a first scan of the sense array 420, the quadrature demodulator 430A may use a first in-phase sequence and a first quadrature sequence (e.g., a first set of sequences) and during a second scan of the sense array 520, the quadrature demodulator 430A may use a second in-phase sequence and a second quadrature sequence (e.g., a second set of sequences). The in-phase sequence IRef 431 and the quadrature sequence QRef 432 may also be referred to as demodulation sequences. A demodulation sequence may be any sequence that may be used to demodulate (e.g., decode) data from a signal.

The in-phase component of the digital signal is provided to integrator 433 which generates the value I and the quadrature component of the digital signal is provided to integrator 434 which generates the value Q. In one embodiment, the integrators 433 and 434 may be low-pass filters. The values I and Q are provided to detector 451. The detector 451 may process the I and Q values to obtain a value or result $Y_C$. The detector 452 includes power square units 435 and 436. Power square unit 435 may square the value I and power square unit 436 may square the value Q. The square values $I^2$ and $Q^2$ may then be summed using adder 437 and the sum is provided to the square root circuit 438. The square root circuit 438 calculates a square root of the summed value and provides the square root value to an averaging circuit 439. The averaging circuit 439 may obtain an average of multiple square root values to determine a result $Y_C$. The result $Y_C$ may be transferred, e.g., for stylus touch detection and stylus touch coordinate calculation. For example, the $Y_C$ value may be compared with a threshold value to determine whether the $Y_C$ value is greater than a threshold value. If the $Y_C$ value is greater than the threshold value, this may indicate that a stylus is present (e.g., proximate to the sense array 420). In one embodiment, the $Y_C$ value may be determined using the following equation:

$$Y_C = \Sigma_{i=1}^{M} \sqrt{I_i^2 + Q_i^2} \quad (1)$$

where M is the total number of square root values. In one embodiment, the $Y_C$ value is the magnitude value of the signal received from the RX channel 422A. The $Y_C$ value may be used to detect the presence of the stylus 410 and may also be used to determine the position of the stylus 410.

In one embodiment, the quadrature demodulator 430A may process the I and Q values to decode or demodulate stylus data from the digital signal received from the data buffer 429 (not shown in the figures). For example, the one or more of the in-phase component or the quadrature component of the digital signal may encode stylus data such as battery data (e.g., data indicative of the battery level or power level of the stylus 410), acceleration data (e.g., data indicative of an acceleration of the stylus 410), button data (e.g., data indicative of whether a button is pressed or a length of time a button is pressed), or force data (e.g., data indicative of an amount of force or pressure on the tip the stylus 410). In one embodiment, stylus data may include any data or information transmitted by the stylus 410. In other embodiments, other types of data may be decoded from the digital signal by the quadrature demodulator 430A.

Quadrature demodulators 430B through 430N may include components that are similar to the components in quadrature demodulator 430A (e.g., multipliers, integrators, power square units, etc.) and may perform functions, operations or actions similar to quadrature demodulator 430A. It should be understood that the in other embodiments, the system 400 may include any number of quadrature demodulators. For example, the system 400 may include four quadrature demodulators, 24 quadrature demodulators, etc. In one embodiment, the system 400 may include one quadrature demodulator for each RX channel (e.g., the number of quadrature demodulators is equal to the number of RX channels). In one embodiment, the quadrature demodulators 430A through 430N may be part of a processing device or a touch screen controller (as illustrated in FIGS. 1, 2A, and 2B). In another embodiment, the operations, functions, or actions of the quadrature demodulators 430A through 430 may be performed by a processing device or a touch screen controller.

In one embodiment, the quadrature demodulators 430A through 430N may allow a capacitive sense array 420 to detect the presence of both a finger and unsynchronized stylus using a single receiver having two different modes of operation or simultaneously by adding an additional parallel processing channel. The different sensing modes (i.e., finger sensing and stylus sensing) differ in the cycle-by-cycle post-processing options. Since the sensing engine operation is not changed, the fundamental capacitance sensing channel setup does not change for the different modes. Using different post-processing algorithms (e.g. using the different demodulation sequences) for the same data stream allows potentially implementing fully parallel stylus and touch sensing, as parallel processing channels allow building receivers with different center frequencies. The only change is that all of the electrodes in the sense array 420 are connected to receiver inputs in the stylus scanning mode (rather that the rows being connected to a transmitter). Then the parallel data processing allows stylus and touch detection at coordinates where the receiving electrodes are connected. In one embodiment, however, upon detection of a stylus proximate to the sense array 420, the sense array 420, may switch to a stylus only sensing mode, which may eliminate any interference due to the possible presence of even harmonics in any stylus transmitter signal.

Figure 5:
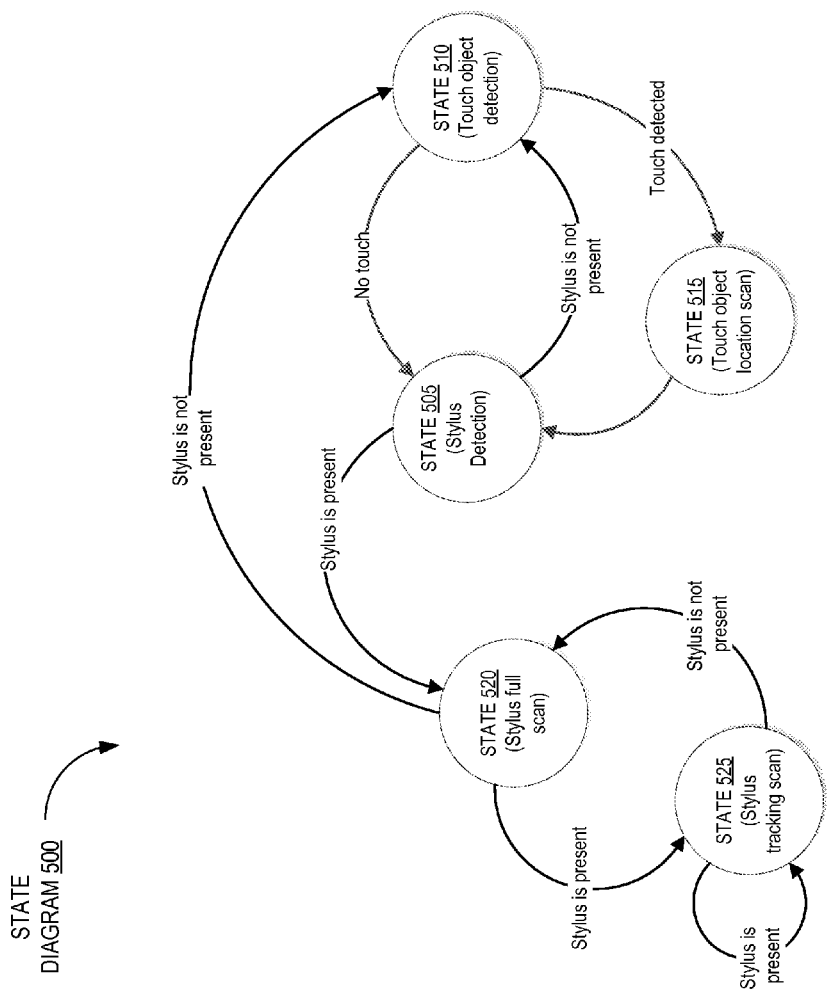
FIG. 5 is a state diagram of an example operation of a system that may detect a presence of a touch object and a stylus, according to an embodiment

FIG. 5 is a state diagram 500 of an example operation of a system (such 200 illustrated in FIG. 2A or system, 202 illustrated in FIG. 2B) that may detect a presence of a touch object and a stylus, according to an embodiment. The state diagram includes five states, state 505, state 510, state 515, state 520, and state 525. The state diagram may start at state 505, where the system performs a first scan of electrodes in a sense array (as illustrated in FIG. 2B) to detect the presence of a stylus (e.g., detect a TX signal from a stylus or determine whether a stylus is close or proximate to the sense array). If the stylus is not present or is not detected the system may proceed or transition to state 510. In one embodiment, when performing the first scan to detect the presence of the stylus, the system may not scan all of the electrodes in the sense array. For example, the system may scan the vertical electrodes in the sense array or may scan the horizontal electrodes in the sense array. In another embodiment, the system may use a first set of sequences (e.g., a set of sequences that includes a first in-phase sequence and a first quadrature sequence) when processing (e.g., demodulating) data received from the first scan. For example, referring back to FIG. 4, the system may use the first in-phase sequence and the first quadrature sequence in the quadrature demodulator 430A to obtain the $Y_C$ value (e.g., a value use to determine whether the stylus is present or proximate to a sense array). The system may compare the $Y_C$ value with a threshold value to determine whether the stylus is present.

In state 510, the system may switch to a first mode of operation to detect the presence of touch objects (e.g., a passive stylus, a finger of a user, etc.). The system performs a scan of the electrodes in the sense array to determine if a touch object is present or detected. If a touch object is detected, the system transitions or proceeds to state 515 where the system performs a scan of the electrodes in the sense array to determine the position of the touch object. After determining the position of the touch object, the system transitions or proceeds back to state 505. If no touch object was detected in state 510, the system also transitions or proceeds back to state 505.

If a stylus is detected in state 505, the system transitions or proceeds to state 520, where the system may perform a second scan of the sense array to detect the presence of the stylus and also to determine the location of the stylus. In one embodiment, when performing the second scan, the system may scan all of the electrodes in the sense array. For example, the system may scan horizontal and vertical electrodes in the sense array. In another embodiment, the system may use a second set of sequences (e.g., a set of sequences that includes a second in-phase sequence and a second quadrature sequence) when processing (e.g., demodulating) data received from the second scan. For example, referring back to FIG. 4, the system may use the second in-phase sequence and the second quadrature sequence in the quadrature demodulator 430A to obtain the $Y_C$ value (e.g., a value use to determine whether the stylus is present or proximate to a sense array). The system may compare the $Y_C$ value with a threshold value to determine whether the stylus is present.

If the stylus is not detected (e.g., the stylus is not present), the system may proceed or transition back to state 510. If the stylus is detected, the system may transition or proceed to state 525, where the system may perform one or more additional scans to track continue detecting the stylus and to track the movement of the stylus. If the stylus remains present (e.g., the stylus is continually detected), the system may remain in state 525. If the stylus is no longer detected at tome point in time, the system may transition or proceed back to state 520. In one embodiment, during the additional scans performed in state 525, the system may use one of the sets of sequences (e.g., an in-phase sequence and a quadrature sequence) that were used in state 505 or state 520. In another embodiment, during the additional scans performed in state 525, the system may use a different set of sequences than the sets of sequences (e.g., an in-phase sequence and a quadrature sequence) that were used in state 505 or state 520. In one embodiment, the stylus detection may be performed by analyzing the strength (e.g., the magnitude) of signals received by the receivers (e.g., receiver 422A as illustrated in FIG. 4).

FIG. 6 illustrates example sets of sequences that may be used to detect a presence of a stylus, according to one embodiment. Set 610 includes two sequences $IRef_1$ and $QRef_1$. $IRef_1$ includes the values [+1, −1, −1, +1, +1, −1, −1, +1] and $QRef_1$ includes the values [+1, +1, −1, −1, +1, +1, −1, −1]. The sequences $IRef_1$ and $QRef_1$ are orthogonal to each other (e.g., sequence $QRef_1$ is the same as sequence $IRef_1$ shifty by) 90°. Set 620 includes two sequences $IRef_2$ and $QRef_2$. $IRef_2$ includes the values [+1, +1, +1, +1, −1, −1, −1, −1] and $QRef_2$ includes the values [+1, +1, −1, −1, −1, −1, +1, +1]. The sequences $IRef_2$ and $QRef_2$ are orthogonal to each other (e.g., sequence $QRef_2$ is the same as sequence $IRef_2$ shifted by 90°). Set 630 includes two sequences $IRef_3$ and $QRef_3$. $IRef_3$ includes the values [+0.38, +0.92, +0.92, +0.32, −0.38, −0.92, −0.92, −0.32] and $QRef_3$ includes the values [+0.92, +0.32, −0.38, −0.92, −0.92, −0.32, +0.38, +0.92]. The sequences $IRef_3$ and $QRef_3$ are orthogonal to each other (e.g., sequence $QRef_3$ is the same as sequence $IRef_3$ shifted by 90°). $IRef_1$, $IRef_2$, and $IRef_3$ may be in-phase sequences that may be used by a quadrature demodulator (as illustrated in FIG. 4). $QRef_1$, $QRef_2$, and $QRef_3$ may be quadrature sequences that may be used by a quadrature demodulator (as illustrated in FIG. 4).

As shown in FIG. 6, the sequences in set 610 (e.g., $IRef_1$ and $QRef_1$) and the sequences in set 620 (e.g., $IRef_1$ and $QRef_1$) include values that have one of two numerical values, +1 or −1. In one embodiment, the values in a sequence may be multiplied by a coefficient (e.g., another numerical value). As illustrated in FIG. 6, the sequences $IRef_3$ and $QRef_3$ may be obtained by multiplying the sequences $IRef_2$ and $QRef_2$ by one of the coefficients 0.32, 0.38, or 0.92. For example, the first value in the sequence $IRef_3$ may be obtained by multiple the value+1 with the coefficient 0.38. In another example, the second value in the sequence $IRef_3$ may be obtained by multiple the value+1 with the coefficient 0.92. In one embodiment, the coefficients may be harmonic coefficients such as $\cos(\pi/8+n*\pi/4)$ for the QRef sequence and $\sin(\pi/8+n*\pi/4)$ for the IRef sequence wherein "n" is an integer number. When "n" ranges from 0 to 7 the following sequences of the coefficients may be obtained: QRef=[0.9239, 0.3827, −0.3827, −0.9239, −0.9239, −0.3827] and IRef=[0.3827, 0.9239, 0.9239, 0.3827, −0.3827, −0.9239]. In one embodiment, the coefficients may be used to educe the effect of noise when a processing detects the presence of the stylus.

It should be understood that the sequences illustrated in FIG. 6 are merely example sequences. In some embodiments, the sequences may be of any length (e.g., may have a number of values, such as six values or twenty-four values, etc.). In other embodiments, the sequences may have any combination or permutation of numerical values. In additional embodiments, any number of coefficients may be applied to a sequence to obtain other sequences (as illustrated in set 620 and set 630 of FIG. 6). In one embodiment, one or more of the length of the sequences, the values in the sequences, and the coefficients, may be selected based on a variety of factors, such as the frequency of a TX signal from the stylus, the amount of noise that may be present in the system, etc.

Figure 7:
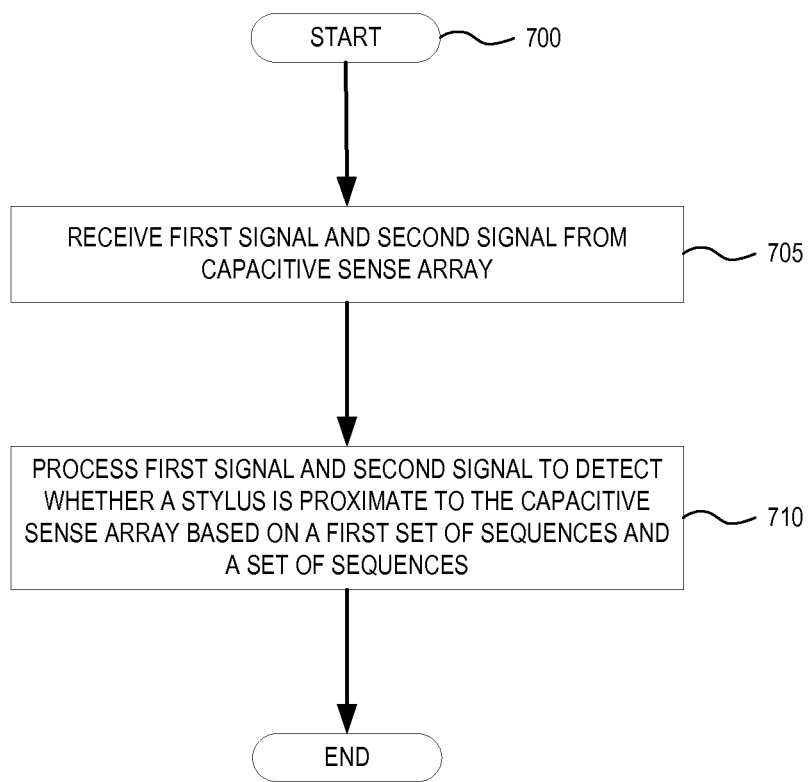
FIG. 7 is a flow chart of one embodiment of a method of detecting a stylus.

FIG. 7 is a flow chart of one embodiment of a method 700 of detecting a stylus. The method 700 may be performed by a host device that comprises hardware (e.g., circuitry, electrodes, switches, dedicated logic, programmable logic, microcode), software (e.g., instructions run on a processing device to perform hardware simulation), or a combination thereof. In one embodiment, method 700 may be performed by processing device 110 as illustrated in FIG. 1 or by quadrature demodulators 430A through 430N illustrated in FIG. 4.

The method 700 begins with the host device receiving a first signal and a second signal from the capacitive sense array at block 705. In one embodiment, the first signal may be received from a subset of the electrodes in the capacitive sense array (e.g., from the vertical electrodes or horizontal electrodes). In another embodiment, the second signal may be received from all the electrodes in the capacitive sense array. At block 710, the host device processes the first signal and the second signal to determine whether the stylus is proximate to the capacitive sense array. The host machine may use a first set of sequences to process the first signal and a second set of sequences to process the second signal. For example, referring back to FIG. 6, the host machine may use the sequences in set 630 to process the first signal and the sequences in set 620 to process the second signal.

Figure 8:
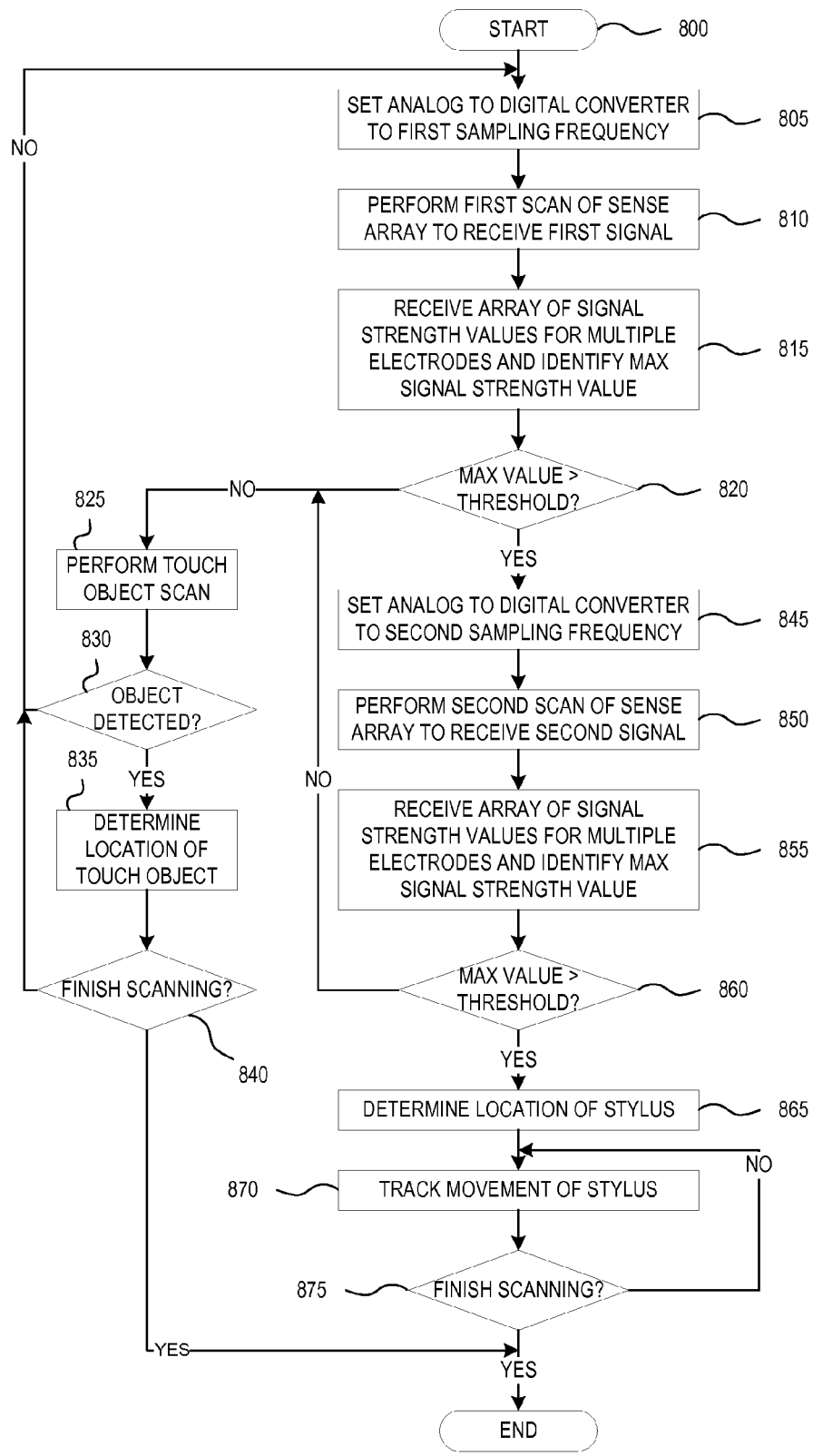
FIG. 8 is a flow chart of another embodiment of a method of detecting a stylus.

FIG. 8 is a flow chart of one embodiment of a method 800 of detecting a stylus. The method 800 may be performed by a host device that comprises hardware (e.g., circuitry, electrodes, switches, dedicated logic, programmable logic, microcode), software (e.g., instructions run on a processing device to perform hardware simulation), or a combination thereof. In one embodiment, method 800 may be performed by processing device 110 as illustrated in FIG. 1 or by quadrature demodulators 430A through 430N illustrated in FIG. 4.

The method 800 begins with the host device setting an ADC (e.g., such as ADC 428 illustrated in FIG. 4) to a first sampling frequency. The host device scans a sense array using the ADC at the first sampling frequency to receive a first signal. At block 810, the host device performs a first scan of the sense array to receive the first signal. As discussed above, the first signal may be received from a subset of the electrodes in the sense array (e.g., the vertical electrodes or the horizontal electrodes). At block 815, the host device may obtain or receive an array of signal strength values for multiple electrodes (e.g., may receive multiple strength values, one for each of the multiple electrodes). The host device may identify a maximum value (e.g., the highest signal strength value) from the array of signal strength values. At block 820, the host device determines whether the maximum value is greater than a threshold value.

If the max value is not greater than the threshold value, the host device may switch to a second mode of operation at block 825 and may perform a touch object scan of the sense array to detect a touch object. At block 830, the host device determines whether a touch object is detected. If no touch object is detected, the host device proceeds back to block 805. If a touch object is detected, the host device proceeds to block 835 where the host device determines the location of the touch object. At block 840, the host device may determine whether to continue scanning (e.g., whether scanning has finished). A host device may stop or discontinue scanning if a user powers down the host device or the host device determines that the host device should enter a reduce power mode (e.g., a mode where the host device uses less power). If the host device has finished scanning, the method 800 ends. If the host device has not finished scanning, the host device proceeds back to block 805.

Referring back to block 820, if the max value is greater than the threshold, the host machine sets the ADC to a second sampling frequency at block 845. The second sampling frequency may be the same or may be different from the first sampling frequency. The host device scans a sense array using the ADC at the second sampling frequency to receive a first signal. At block 850, the host device performs a second scan of the sense array to receive the second signal. As discussed above, the second signal may be received from all of the electrodes in the sense array. At block 855, the host device may obtain or receive an array of signal strength values for multiple electrodes (e.g., may receive multiple strength values, one for each of the multiple electrodes). The host device may identify a maximum value (e.g., the highest signal strength value) from the array of signal strength values. At block 860, the host device determines whether the max value is greater than a threshold value. The threshold value may be the same or different from the threshold value used in block 820. If the max value is not greater than the threshold, the host machine proceeds to block 825. If the max value is greater than the threshold, the host machine determines that the stylus is proximate to the sense array and determines the location of the stylus at block 865. In one embodiment, the stylus location may be based on the first signal received from the first scan, the second signal received from the second scan, or both the first signal and the second signal. At block 870, the host machine tracks the motion of the stylus (e.g., by performing additional scans of the sense array and processing additional signals). At block 875, the host device may determine whether to continue scanning (e.g., whether scanning has finished). If scanning has not finished, the host device proceeds to block 870. If scanning has finished, the method 800 ends. In one embodiment, the host device may continue tracking the movement of the stylus until stylus is no longer proximate or near to the sense array.

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing," "receiving," "extracting," "scanning," "determining," "terminating," "switching," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

Although the operations of the methods herein are shown and described in a particular order, the order of the operations of each method may be altered so that certain operations are omitted, so that certain operations are added, so that certain operations may be performed in an inverse order, or so that certain operations may be performed, at least in part, concurrently with other operations. In another embodiment, instructions or sub-operations of distinct operations may be in an intermittent and/or alternating manner.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus comprising:
   a sense array comprising a plurality of electrodes;
   an analog-to-digital converter (ADC) coupled to the sense array and configured to receive signals from the sense array in a first mode and in a second mode; and
   a processing device coupled to the sense array and to the ADC, the processing device configured at least to:
   set the ADC to a first sampling frequency in the first mode;
   and set the ADC to a second sampling frequency in the second mode.

2. The apparatus of claim 1, wherein the processing device is configured to detect a stylus proximate to the sense array in the first mode.

3. The apparatus of claim 1, wherein the processing device is configured to detect a touch object proximate to the sense array in the second mode.

4. The apparatus of claim 1, wherein the processing device is configured to detect a stylus in the first mode concurrently with detecting a touch object in the second mode.

5. The apparatus of claim 1, wherein the processing device is further configured to switch to the first mode in response to detecting a stylus proximate to the sense array, wherein the first mode comprises stylus only sensing.

6. The apparatus of claim 1, wherein the processing device is further configured to switch to the second mode to detect a touch object proximate to the sense array.

7. The apparatus of claim 1, wherein the processing device further comprises:
 a first processing stream to process a first in-phase component of a first signal and a second in-phase component of a second signal; and
 a second processing stream to process a first quadrature component of the first signal and a second quadrature component of the second signal.

8. The apparatus of claim 7, wherein the first signal is received from a first scan of the sense array and the second signal is received from a second scan of the sense array.

9. The apparatus of claim 8, wherein the first scan of the sense array and the second scan of the sense array are used in the first mode to detect a stylus proximate to the sense array.

10. The apparatus of claim 8, wherein the first scan of the sense array and the second scan of the sense array are used in the second mode to detect a touch object proximate to the sense array.

11. A method comprising:
 setting an analog-to-digital converter (ADC) to a first sampling frequency in a first mode, wherein the ADC is coupled to a sense array that comprises a plurality of electrodes;
 receiving a first plurality of signals from the sense array in the first mode;
 setting the ADC to a second sampling frequency in a second mode; and
 receiving a second plurality of signals from the sense array in the second mode.

12. The method of claim 11, further comprising detecting a stylus proximate to the sense array in the first mode based on the first plurality of signals.

13. The method of claim 11, further comprising detecting a touch object proximate to the sense array in the second mode based on the second plurality of signals.

14. The method of claim 11, further comprising detecting a stylus in the first mode concurrently with detecting a touch object in the second mode.

15. The method of claim 11, further comprising switching to the first mode in response to detecting a stylus proximate to the sense array, wherein the first mode comprises stylus only sensing.

16. The method of claim 11, further comprising switching to the second mode to detect a touch object proximate to the sense array.

17. The method of claim 11, further comprising:
 processing, in a first stream, a first in-phase component of a first signal and a second in-phase component of a second signal; and
 processing, in a second stream, a first quadrature component of the first signal and a second quadrature component of the second signal.

18. The method of claim 17, wherein the first signal is received from a first scan of the sense array and the second signal is received from a second scan of the sense array.

19. The method of claim 18, further comprising using, in the first mode, the first scan of the sense array and the second scan of the sense array to detect a stylus proximate to the sense array.

20. The method of claim 18, further comprising using, in the second mode, the first scan of the sense array and the second scan of the sense array to detect a touch object proximate to the sense array.

21. An apparatus comprising:
 an analog-to-digital converter (ADC) coupled to a sense array comprising a plurality of electrodes and configured to receive signals from the sense array in a first mode and in a second mode; and
 a processing device coupled to the sense array and to the ADC, the processing device configured at least to:
  set the ADC to a first sampling frequency in the first mode; and
  set the ADC to a second sampling frequency in the second mode,
  wherein the processing device is configured to conduct switching between the first mode and the second mode, each mode relating to a frequency of a transmission signal transmitted from a stylus detected through the sense array.

22. An method comprising:
 setting an analog-to-digital converter (ADC) to a first sampling frequency in a first mode, wherein the ADC is coupled to a sense array that comprises a plurality of electrodes;
 receiving a first plurality of signals from the sense array in the first mode;
 setting the ADC to a second sampling frequency in a second mode;
 receiving a second plurality of signals from the sense array in the second mode; and
 switching between the first mode and the second mode, wherein the switching between the first mode and the second mode corresponds to a frequency of a transmission signal transmitted from a stylus detected through the sense array.

* * * * *